United States Patent [19]

Dierberger et al.

[11] 4,040,767

[45] Aug. 9, 1977

[54] COOLABLE NOZZLE GUIDE VANE

[75] Inventors: James Albert Dierberger, Hebron; Loren Hawdon White, East Hartford, both of Conn.

[73] Assignee: United Technologies Corporation, Hartford, Conn.

[21] Appl. No.: 713,734

[22] Filed: Aug. 11, 1976

Related U.S. Application Data

[63] Continuation-in-part of Ser. No. 583,142, June 2, 1975, abandoned.

[51] Int. Cl.[2] .......................... F01D 25/12; F02C 7/18

[52] U.S. Cl. .................................... 415/115; 415/116; 416/97 A

[58] Field of Search ........................ 415/115, 116, 117; 416/95, 96, 96 A, 97, 97 A

[56] References Cited

U.S. PATENT DOCUMENTS

| | | | |
|---|---|---|---|
| 3,240,468 | 3/1966 | Watts | 415/117 |
| 3,433,015 | 3/1969 | Sneeden | 415/117 |
| 3,610,769 | 10/1971 | Schwedland | 415/115 |
| 3,628,880 | 12/1971 | Smuland | 415/115 |
| 3,644,059 | 2/1972 | Bryan | 416/97 |
| 3,706,508 | 12/1972 | Moskowitz | 415/115 |
| 3,726,604 | 4/1973 | Helms | 415/115 |

*Primary Examiner*—Carlton R. Croyle
*Assistant Examiner*—L. J. Casaregola
*Attorney, Agent, or Firm*—Robert C. Walker

[57] ABSTRACT

A coolable nozzle guide vane in the turbine section of a gas turbine engine is disclosed. The vane has a platform section and an airfoil section which are adapted to receive and distribute cooling air about the walls of the sections which are in contact with the hot working medium gases flowing through the turbine during operation of the engine. Impingement cooling and transpiration cooling techniques are combined to maximize the cooling effectiveness of the air supplied.

9 Claims, 4 Drawing Figures

COOLABLE NOZZLE GUIDE VANE

The invention herein described was made in the course of or under a contract with the Department of the Navy.

This is a continuation-in-part of application Ser. No. 583,142, filed June 2, 1975 (now abandoned).

BACKGROUND OF THE INVENTION

1. Field of the Invention

This invention relates to gas turbine engines and more particularly to apparatus for cooling the walls of a vane which is disposed across the path of working medium gases in the turbine section of the engine.

2. Description of the Prior Art

A limiting factor in many turbine engine designs is the maximum temperature of the working medium gases which can be tolerated in the turbine without adversely limiting the durability of the individual components. The rotor blades and the nozzle guide vanes of the turbine are particularly susceptible to thermal damage and a variety of cooling techniques is applied to control the temperature of the material comprising these components in the face of high turbine inlet temperatures. In many of these techniques air is bled from the compressor to the local area to be cooled through suitable conduit means. Compressor air is sufficiently high in pressure to cause the air to flow into the local area of the turbine without auxiliary pumping and is sufficiently low in temperature to provide the required cooling capacity.

Most recently considerable design effort has been expended to minimize the amount of air consumed for cooling of the turbine components. Impingement cooling is one of the more effective techniques and occurs where a high velocity air stream is directed against a component to be cooled. The high velocity stream impinges upon a surface of the component and increases the rate of heat transfer between the component and the cooling air. A typical application of impingement cooling is discussed by Smuland et al in U.S. Pat. No. 3,628,880 entitled "Vane Assembly and Temperature Control Arrangement". Smuland et al shows baffle plates interposed between the cooling air supply and the surface to be cooled. Orifices in each plate direct jets of the cooling air across an intermediate space between the baffle and the cooled surface during operation of the engine. The pressure ratio across each plate is sufficiently high to cause the cooling air to accelerate to velocities at which the flow impinges upon the opposing surface. Cooling air is exhausted from the intermediate space between the plate and the opposing surface at a high rate to prevent the buildup of backpressure within the space. In Smuland et al film cooling passageways are utilized to exhaust the impingement flow.

A second highly effective but not as widely utilized technique is that of transpiration cooling. A cooling medium is allowed to exude at low velocities through a multiplicity of tiny orifices in the wall of the component to be cooled. The low velocity flow adheres to the external surface of the component and is carried axially downstream along the surface by the working medium gases flowing thereacross. In transpiration cooling the exuding velocities must remain low in order to prevent over penetration of the working medium gases by the cooling air. Over penetration interrupts both the flow of cooling air and the flow of medium gases and renders the cooling ineffective. One typical application of transpiration cooling to a turbine vane is discussed by Moskowitz et al in U.S. Pat. No. 3,706,506 entitled "Transpiration Cooled Turbine Blade with Metered Coolant Flow". Moskowitz et al shows a plurality of coolant channels formed across the chord of the blade to accommodate both temperature and pressure gradients across the chord. Cooling air is flowed to each channel through a metering plate at the base of the airfoil section. A preferred pressure ratio across the cooled wall in most transpiration cooled embodiments is approximately (1.25). The effectiveness of a transpiration cooled construction is highly sensitive to variations from the designed pressure ratio across the surface to be cooled; accordingly, the pressure ratio must be closely controlled.

Impingement and transpiration cooling are combined in one airfoil section in U.S. Pat. No. 3,726,604 to Helms et al entitled "Cooled Jet Flap Vane". The impingement cooling is applied to the leading edge of the airfoil and the transpiration cooling is applied to the suction and pressure walls, however, both cooling techniques are not applied simultaneously to supplement each other in cooling a common portion of the vane wall.

The platform region at the base of each guide vane is also cooled in many constructions. In U.S. Pat. No. 3,610,769 to Schwedland et al, cooling air is flowed in accordance with transpiration cooling techniques into the working medium flow path at low velocities through small diameter cooling holes in the platform of each vane. In FIG. 1 of Schwedland et al it is apparent that the entire platform of each vane is fed with cooling air from a single supply chamber which extends beneath the suction and pressure sides of the platform and over the entire axial length of the platform.

The above described cooling techniques, have been successful in prolonging the life of various turbine components, however, the requirement for even more durable, high performance engines exists. More effective ways of cooling with smaller quantities of air than are presently required are being sought.

SUMMARY OF THE INVENTION

A primary object of the present invention is to improve the performance and durability of a gas turbine engine through the judicious use of cooling air supplied to the guide vanes of the turbine nozzle.

The present invention is predicated upon the recognition that impingement cooling and transpiration cooling can be effectively combined over the entire surface of a coolable vane if the pressure ratio across the transpiration cooled surface is closely controlled by isolating adjacent impingement chambers from one another and by controlling the size of the impingement orifices to provide a successively diminished pressure in each adjacent downstream chamber.

According to the present invention, a plurality of axially adjacent chambers is formed within the airfoil section of a nozzle guide vane between the airfoil walls and an airfoil baffle which is spaced apart therefrom, and a plurality of radially adjacent chambers are formed within the platform section of the vane between the platform walls and a platform baffle which is spaced apart therefrom; each of the airfoil and platform walls has a multiplicity of transpiration cooling holes which communicatively join a respective chamber to the working medium flow path wherein the transpiration cooling holes and the baffles are sized to maintain a substantially equal pressure ratio across the airfoil and platform walls during operation of the engine.

A primary feature of the present invention is the multiplicity of cooling chambers which is located adjacent the airfoil and the platform walls. Air supply means, which in one embodiment includes a baffle plate, maintains a substantially equal pressure ratio across the walls between each cooling chamber and the adjacent portion of the working medium flow path. Each baffle plate has a plurality of orifices which direct cooling flow at a high velocity against the opposing wall to impingement cool the wall; transpiration cooling holes between each chamber and the adjacent portion of the working medium flow path further cool the vane walls as air is flowed through the holes during operation of the engine.

A principal advantage of the present invention is the improved utilization of the cooling air which is made possible by the effective combination of transpiration and impingement cooling techniques over the entire airfoil and platform walls. The nearly uniform pressure ratio between each chamber and the adjacent portion of the working medium flow path reduces the wasteful flow of excess cooling air into the medium flow path and improves the effectiveness of the transpiration cooling air which exudes from the chambers and flows along the external side of the vane walls without substantially penetrating the working medium.

The foregoing, and other objects, features and advantages of the present invention will become more apparent in the light of the following detailed description of the preferred embodiment thereof as shown in the accompanying drawing.

DESCRIPTION OF THE PREFERRED EMBODIMENT

Figure 1:
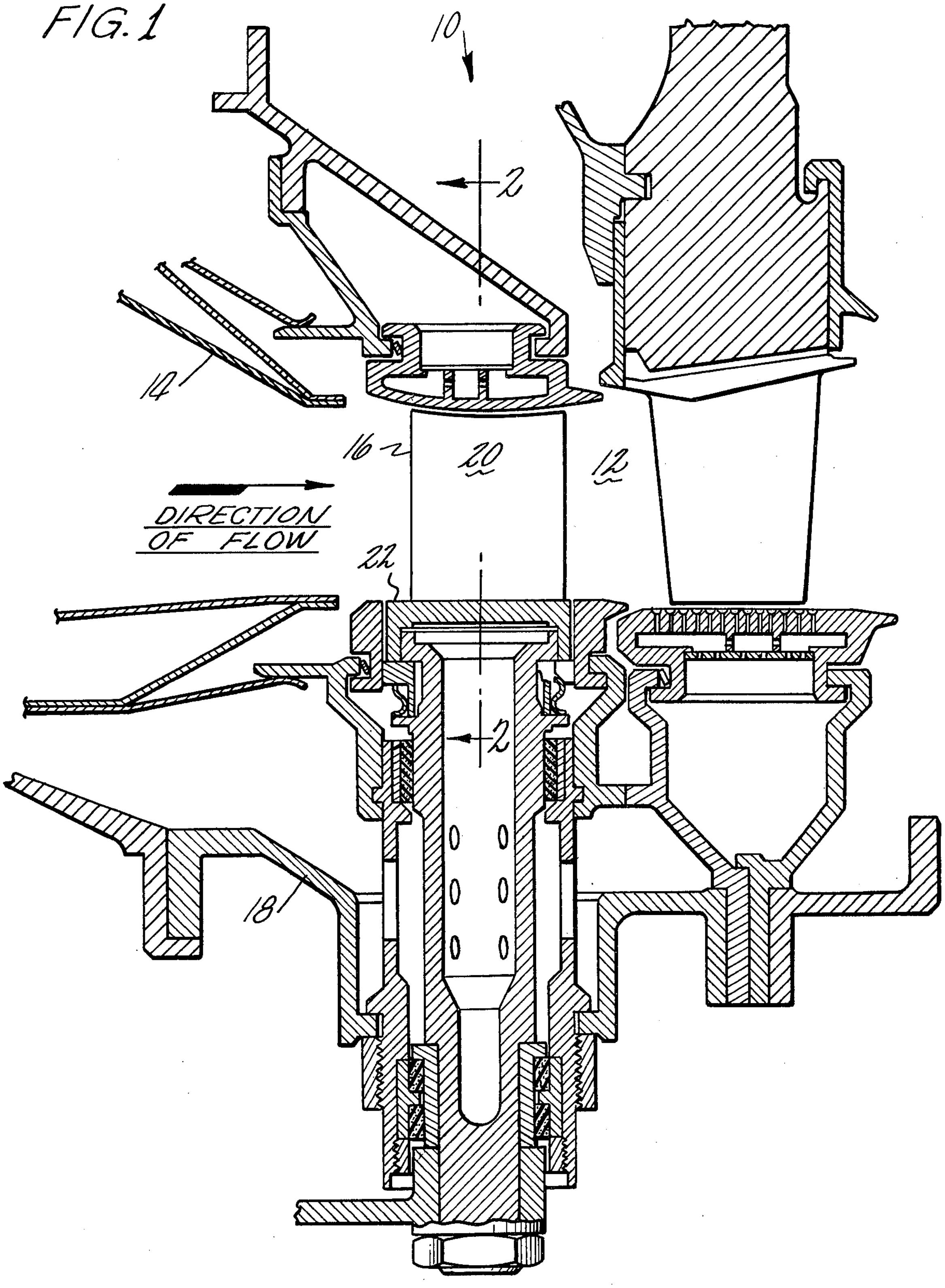
FIG. 1 is a cross section view showing a nozzle guide vane at the entrance to the turbine section of an engine.
Figure 2:
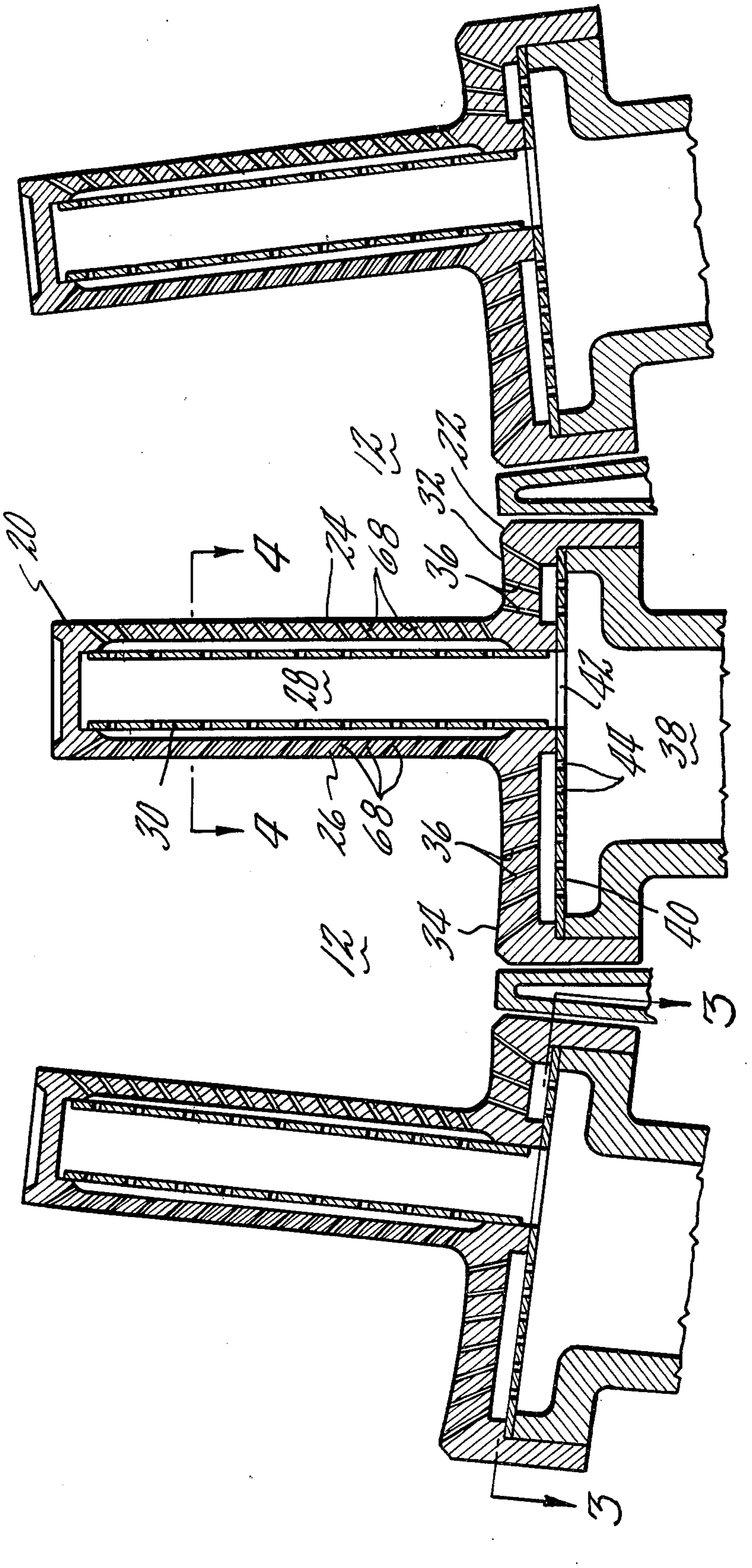
FIG. 2 is a sectional view taken along the line 2—2 as shown in FIG. 1.

A portion of a gas turbine engine having a turbine section 10 is shown in FIG. 1. The turbine section has an annular flow path 12 extending axially downstream from a combustion chamber 14. Disposed across the flow path is a nozzle guide vane 16 which is cantilevered from a turbine case 18 and is rotatable in the embodiment shown. A plurality of the vanes 16 is spaced circumferential within the flow path at the location shown. Each vane has an airfoil section 20 and a platform section 22 which are more fully shown in the FIG. 2 sectional view. The airfoil section has a suction wall 24 and a pressure wall 26 and includes an airfoil cavity 28 disposed therebetween. Within the airfoil cavity is an airfoil baffle 30 which is maintained in spaced relationship with the pressure and suction walls. The platform section 22 has a suction wall 32 and a pressure wall 34 both of which include a multiplicity of transpiration cooling holes 36. Contained within the platform section is a platform cavity 38 having a platform baffle 40 disposed therein. The platform baffle has a supply aperture 42 which communicatively joins the airfoil and platform cavities and has a multiplicity of impingement orifices 44.

Figure 3:
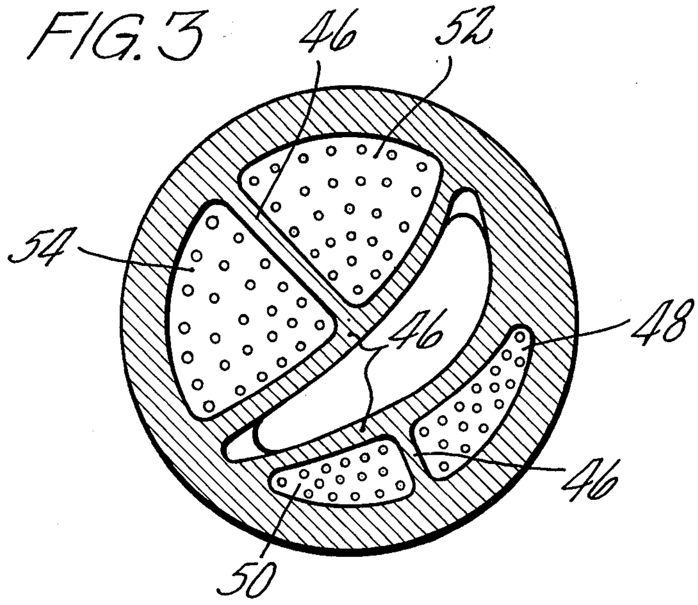
FIG. 3 is a sectional view taken along the line 3—3 as shown in FIG. 2.

As shown in FIG. 3 the platform section has a plurality of platform ribs 46. The ribs in conjunction with the suction wall 32 and the baffle 40 form an upstream, suction wall chamber 48 and a downstream, suction wall chamber 50. The ribs in conjunction with the pressure wall 34 and the baffle 40 form an upstream, pressure wall chamber 52 and a downstream, pressure wall chamber 54. The multiplicity of the transpiration cooling holes 36 as viewed in FIG. 2 communicatively join each platform chamber to the medium flow path 12.

Figure 4:
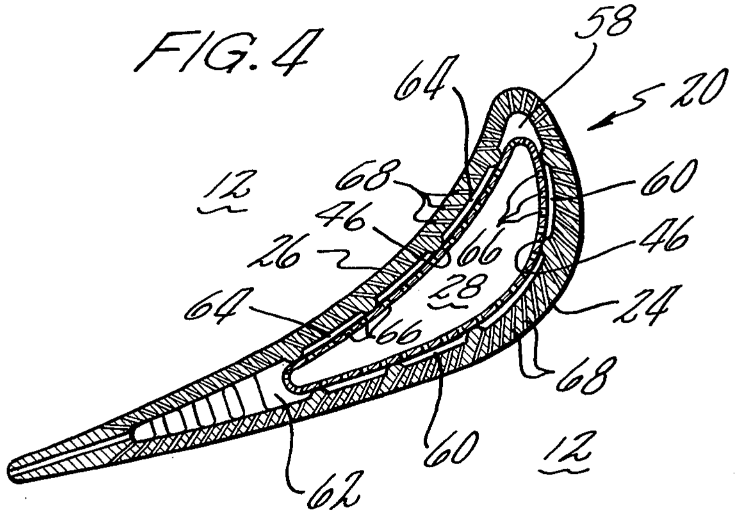
FIG. 4 is a sectional view taken along the line 4—4 as shown in FIG. 2.

The airfoil section 20 as is shown in FIG. 4, has a plurality of airfoil ribs 46 which are oriented in a spanwise direction with respect to the airfoil section and extend from the suction wall 24 and the pressure wall 26 to the airfoil baffle 30 forming a leading edge chamber 58, a plurality of suction wall chambers 60, a trailing edge chamber 62 and the plurality of pressure wall chambers 64. The airfoil baffle has a multiplicity of impingement orifices 66 which communicatively join the airfoil cavity 28 to each of the respective chambers. A multiplicity of transpiration cooling holes 68 communicatively join each of the respective airfoil chambers to the working medium flow path 12.

In one embodiment the impingement orifices 66 through which air is flowed to an upstream, suction wall chamber 60 have a diameter of .010 of an inch and the transpiration cooling holes 68 through which air is flowed from the suction wall chamber have a diameter of 0.006 of an inch. Eighty impingement orifices and 130 transpiration holes are uniformly distributed over the respective portions of the baffle 30 and the wall 24.

In the same embodiment the immediately adjacent downstream chamber 60 has orifices 66 of 0.006 of an inch diameter and holes 68 of 0.008 of an inch diameter. In this downstream chamber 60 impingement orifices and 100 transpiration holes are uniformly distributed over the respective portions of the baffle 30 and the wall 24.

The orifices and hole sizes set forth above describe but one effective embodiment of applicants' invention. Other combinations may also provide suitable pressure control means which are capable of producing the desired control functions, as described and claimed herein, will be recognized by those skilled in the art.

During operation of the engine the temperature of the working medium gases within the flow path 12 greatly exceeds the maximum allowable temperature of the vane material. Cooling air is flowed through each of the nozzle guide vanes 16 to maintain the material temperatures at a level which is constant with durable operation of the turbine. The cooling air is conventionally supplied to the platform cavities 38 through conduit means which are in gas communication with the engine compressor. Conduit means may be internal or external of the turbine case 18 and do not comprise a portion of the inventive concepts described herein.

The cooling air is supplied at a pressure which is sufficiently high to permit the series combination of impingement and transpiration cooling techniques. The airfoil cavity 28 is in communication with the platform cavity 38 through the supply aperture 42. The supply aperture is sufficiently large to permit the flow of air into the airfoil cavity with only a minimal pressure drop across the platform baffle 40. Accordingly, the pressure of the air in the platform and airfoil cavities is substantially the same and in one embodiment is approximately 300 pounds per square inch at takeoff.

The airfoil sections 20 of the vanes extend radially inward across the flow path 12 and are directly exposed to the hot working medium gases flowing thereacross. The pressure and temperature of the working medium gases at the upstream end of the airfoil sections are greater than at the downstream end. Additionally, the pressure of the medium gases, adjacent the pressure wall 26 of each airfoil section 20 is greater than the pressure adjacent the suction wall 24. The impingement orifices 66 of the airfoil baffle are sized and spaced to maintain a pressure within each of the pressure wall chambers 64 and suction wall chambers 60 which is less than the axially adjacent upstream chamber. Furthermore, the pressures within the chambers are balanced at levels wherein the pressure ratios across the pressure wall 26 and the suction wall 24 through the transpiration cooling holes 68 are substantially equal. In one particular engine, pressure ratios of approximately 1.25 are preferred and produce exit velocities of cooling air from the transpiration cooling holes which are sufficiently low to permit the air flowing therethrough to adhere to the external surfaces of the airfoil pressure and suction walls. The low cooling air velocities prevent over penetration of the working medium gases by the cooling air which would interrupt both the flow of cooling air and the flow of medium gases and render the cooling technique ineffective.

The flow rate into each of the airfoil pressure wall and suction wall chambers is, as discussed above, set to maintain a nearly uniform pressure ratio across the walls. The impingement orifices 66 are sized and spaced, additionally, to maintain a substantial pressure ratio between each chamber and the airfoil cavity 28. In most preferred constructions a pressure ratio within the range of 1.1 to 1.85 causes the air passing through the orifices in the airfoil baffle to impinge upon the opposing walls.

The platform sections 22 of the vanes form a portion of the outer shroud of the flow path 12 and are directly exposed to the working medium gases flowing thereacross. The pressure and the temperature of the working medium gases at the upstream end of the platform sections is greater than at the downstream end. Additionally, the pressure of the medium gases adjacent the pressure wall 34 of the platform section is greater than the pressure of the gases adjacent the suction wall 32. The impingement orifices 44 of the platform baffle 40 are sized and spaced to maintain a pressure within each of the upstream platform chambers 48 and 52 which is greater than the respective downstream platform chambers 50 and 54. Furthermore, the pressure within the pressure chamber 52 is greater than the pressure within the suction chamber 48 and the pressure within the pressure chamber 54 is greater than the pressure within the suction chamber 50.

The pressures within all of the chambers of the platform section 22 are balanced at levels wherein pressure ratios across the platform walls 32 through the transpiration cooling holes 36 are substantially equal. In one particular engine pressure ratios of approximately 1.25 are preferred and produce exit velocities of cooling air from the transpiration cooling holes which are sufficiently low to permit the air flowing therethrough to adhere to the external surfaces of the platform walls. Low cooling air velocities prevent over penetration of the working medium gases by the cooling air which would interrupt both the flow of cooling air and the flow of medium gases and render the cooling techniques ineffective.

The flow rate into each of the platform chambers as discussed above is balanced to maintain a nearly uniform pressure ratio across the platform walls. The impingement orifices 44 are sized and spaced, additionally, to maintain a substantial pressure ratio between the chambers and the platform cavity 38. In most preferred constructions a pressure ratio within the range of 1.1 to 1.85 causes the air passing through the orifices in the platform baffle to impinge upon the underside of the opposing platform wall.

The transpiration cooling holes of the airfoil and the platform sections are in one embodiment slanted to intersect the flow path 12 in the direction of the medium gases flowing therethrough. The slanted hole construction is less sensitive to higher pressure ratios of the cooling air across the cooled surfaces than in a comparable structure having perpendicular holes because the exuding air has a velocity component in the direction of the medium gases along the cooled surface.

Combining impingement cooling and transpiration cooling techniques in accordance with the described embodiment reduces the quantity of cooling air required to maintain the temperature of the vane material below a maximum allowable level. Furthermore, the multiple chambers of the airfoil and platform sections, which control the pressure differentials across the cooled walls, prevent the wasteful allotment of cooling capacity to regions of lower pressure and temperature.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. In a gas turbine engine having a flow path which extends axially through the turbine section of the engine, a nozzle guide vane disposed across the path, which includes:

an airfoil section comprising a pressure wall having an inner surface and a multiplicity of cooling holes disposed therein, a suction wall having an inner surface and a multiplicity of cooling holes disposed therein, and which is joined to the pressure wall forming an airfoil cavity therebetween, a plurality of sealing ribs which extend from the inner surfaces of the pressure and suction walls of the airfoil section in a spanwise direction with respect to the airfoil section, and baffle means within the airfoil cavity which contact the ribs forming a plurality of axially adjacent chambers along the inner surfaces of the platform and suction walls, the baffle means having a multiplicity of orifices which are sized and spaced to provide flow into each chamber from the airfoil cavity at a velocity which is sufficient to cause the admitted air to impinge upon the opposing inner surfaces of the airfoil walls; and a platform section having an internal platform cavity and comprising a pressure wall having an inner surface and a multiplicity of cooling holes disposed therein, a suction wall having an inner surface and a multiplicity of cooling holes disposed therein, a plurality of sealing ribs which extend into the platform cavity from the inner surfaces of the pressure and suction walls of the platform section, and baffle means within the platform cavity which contact the ribs forming a plurality of adjacent chambers, the baffle means having a multiplicity of orifices which are sized and spaced to provide flow into each chamber from the platform cavity at a velocity which is sufficient to cause the admitted air to impinge upon the inner surfaces of the platform walls, the cooling holes of said platform and airfoil walls and the orifices of said airfoil and platform baffle means being sized and spaced to provide a diminished cooling air pressure in each axially adjacent downstream chamber during operation of the engine.

2. The invention according to claim 1 further including within the platform section a pressure chamber and a circumferentially adjacent suction chamber and wherein the cooling holes of the platform walls and the orifices of the platform baffle means are sized and spaced to provide a higher cooling air pressure in each pressure chamber than in the adjacent suction chamber.

3. In a turbine section of a gas turbine engine having a flow path for working medium gases and including a nozzle guide vane having an airfoil section including a pressure wall and a suction wall which is disposed across the flow path, and having a platform section including a pressure wall and a suction wall which form a portion of an outer shroud radially enclosing the flow path, the improvement which comprises:

a platform cavity which is located radially outward from the pressure and suction walls of the platform section and is adapted to receive cooling air for subsequent distribution about the nozzle guide vane;

an airfoil cavity which is located between the suction and pressure walls of the airfoil section and which is in gas communication with the platform cavity;

a plurality of axially adjacent platform chambers which are formed between the walls of the platform section and a platform baffle which is spaced apart therefrom, wherein the baffle has a plurality of orifices which are sized and spaced to provide flow into each chamber from the platform cavity at a velocity which is sufficient to cause the admitted air to impinge upon the opposing inner surfaces of the walls and wherein the walls contain a multiplicity of cooling holes which are sized and spaced to flow cooling air therethrough at velocities which will enable the exuding air to adhere to the outer surface of the wall; and a plurality of axially adjacent airfoil chambers which are formed between the walls of the airfoil section and an airfoil baffle which is spaced apart therefrom, wherein the baffle has a plurality of orifices which are sized and spaced to provide flow into each chamber from the airfoil cavity at a velocity which is sufficient to cause the air to impinge upon the opposing inner surfaces of the walls and wherein the walls contain a multiplicity of cooling holes which are sized and spaced to flow cooling air therethrough at velocities which will enable the exuding flow to adhere to the outer surfaces of the wall.

4. The invention according to claim 3 which further includes a plurality of circumferentially adjacent platform chambers which are formed between the walls of the platform section and a platform baffle which is spaced apart therefrom, wherein the baffle has a plurality of orifices which are sized and spaced to provide flow into each chamber at a velocity which is sufficient to cause the air to impinge upon the opposing inner surfaces of the walls and wherein the walls contain a multiplicity of cooling holes which are sized and spaced to flow cooling air therethrough at velocities which will enable the exuding flow to adhere to the outer surfaces of the walls.

5. The invention according to claim 4 which further includes means comprising baffle orifices and wall holes for maintaining during operation a greater pressure in each upstream chamber than in the adjacent downstream chamber.

6. The invention according to claim 5 wherein the circumferentially adjacent platform chambers comprise alternating suction wall and pressure wall chambers and which further includes means including baffle orifices and wall holes for maintaining during operation a greater pressure in each pressure wall chamber than in the circumferentially adjacent suction wall chamber.

7. The invention according to claim 3 wherein the nozzle guide vane is rotatable.

8. The invention according to claim 3 wherein said baffle orifices and said wall holes are sized and spaced so as to establish a pressure ratio across the platform and airfoil baffles which is within the range of 1.1 to 1.85 during operation.

9. The invention according to claim 3 wherein said baffle orifices and said wall holes are sized and spaced so as to establish a pressure ratio across the walls of the platform and airfoil sections which is approximately 1.25 during operation.

* * * * *